United States Patent
Soma et al.

(10) Patent No.: US 10,243,200 B2
(45) Date of Patent: *Mar. 26, 2019

(54) CATHODE ACTIVE MATERIAL, ITS MANUFACTURING METHOD, CATHODE, ITS MANUFACTURING METHOD, AND SECONDARY BATTERY

(75) Inventors: Masanori Soma, Fukushima (JP); Atsumichi Kawashima, Fukushima (JP); Masayuki Ihara, Fukushima (JP); Hideki Nakai, Fukushima (JP); Kenichi Kawase, Fukushima (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 26 days.

This patent is subject to a terminal disclaimer.

(21) Appl. No.: 13/472,241

(22) Filed: May 15, 2012

(65) Prior Publication Data

US 2012/0225350 A1  Sep. 6, 2012

Related U.S. Application Data

(63) Continuation of application No. 11/763,222, filed on Jun. 14, 2007.

(30) Foreign Application Priority Data

Jun. 16, 2006 (JP) .................. 2006-168090

(51) Int. Cl.
*H01M 4/131* (2010.01)
*H01M 4/136* (2010.01)
(Continued)

(52) U.S. Cl.
CPC .......... *H01M 4/131* (2013.01); *H01M 4/136* (2013.01); *H01M 4/1391* (2013.01);
(Continued)

(58) Field of Classification Search
CPC .... H01M 4/5825; H01M 4/362; H01M 4/264; H01M 4/268; H01M 4/58; H01M 4/5805;
(Continued)

(56) References Cited

U.S. PATENT DOCUMENTS 5,965,293 A * 10/1999 Idota et al. ................ 429/218.1
6,656,634 B2   12/2003 Hosoya
(Continued)

FOREIGN PATENT DOCUMENTS

JP   05-234621    9/1993
JP   8-138670     5/1996
(Continued)

OTHER PUBLICATIONS

Seki et al (Formation of High-Voltage, High-Capacity All-Solid-State Lithium Polymer Secondary Batteries by Application of the Polymer Electrolyte/Inorganic Electrolyte Composite Concept. Chem Mater. 2005, 17, 2041-2045).*

*Primary Examiner* — Stephen J Yanchuk
(74) *Attorney, Agent, or Firm* — K&L Gates LLP

(57) ABSTRACT

A secondary battery having a cathode, an anode, and an electrolyte is provided. The cathode includes a cathode active material containing at least one kind selected from the group consisting of sulfur S and phosphorus P in a portion near the particle surface of a lithium composite oxide. A content of the kind in the portion is larger than that in the particle of the lithium composite oxide.

17 Claims, 9 Drawing Sheets

(51) Int. Cl.
- *H01M 4/1391* (2010.01)
- *H01M 4/485* (2010.01)
- *H01M 4/505* (2010.01)
- *H01M 4/525* (2010.01)
- *H01M 4/58* (2010.01)
- *H01M 10/0569* (2010.01)
- *H01M 10/0525* (2010.01)

(52) U.S. Cl.
CPC ........... *H01M 4/485* (2013.01); *H01M 4/505* (2013.01); *H01M 4/525* (2013.01); *H01M 4/5825* (2013.01); *H01M 10/0569* (2013.01); *H01M 10/0525* (2013.01); *H01M 2300/0025* (2013.01)

(58) Field of Classification Search
CPC .... H01M 4/5815; H01M 4/131; H01M 4/136; H01M 4/1391; H01M 4/485; H01M 4/505; H01M 4/525; H01M 10/0569; H01M 10/0525; H01M 2300/0025
USPC ......................................................... 429/209
See application file for complete search history.

(56) References Cited

U.S. PATENT DOCUMENTS

| | | | |
|---|---|---|---|
| 7,615,315 B2 * | 11/2009 | Tatsumi et al. | 429/231.95 |
| 2003/0082448 A1 * | 5/2003 | Cho et al. | 429/218.1 |
| 2004/0096743 A1 * | 5/2004 | Okae | H01M 4/131 429/231.1 |
| 2004/0234853 A1 | 11/2004 | Adachi et al. | |
| 2005/0031963 A1 * | 2/2005 | Im et al. | 429/332 |
| 2006/0068292 A1 * | 3/2006 | Mizutani | H01M 4/362 429/231.8 |
| 2006/0093911 A1 * | 5/2006 | Chiga et al. | 429/224 |
| 2006/0222951 A1 | 10/2006 | Tatsumi et al. | |
| 2006/0222955 A1 * | 10/2006 | Ogawa | H01M 2/1653 429/254 |
| 2007/0031732 A1 * | 2/2007 | Chiang | C01B 25/45 429/231.95 |
| 2010/0173197 A1 * | 7/2010 | Li et al. | 429/220 |

FOREIGN PATENT DOCUMENTS

| | | | |
|---|---|---|---|
| JP | 09-027345 | | 1/1997 |
| JP | 10-134798 | | 5/1998 |
| JP | 2000-058070 | | 2/2000 |
| JP | 2001-143694 | | 5/2001 |
| JP | 2004-185221 | | 7/2001 |
| JP | 2003-017061 | | 1/2003 |
| JP | 2003-019713 | | 3/2003 |
| JP | 2003-123755 | | 4/2003 |
| JP | 2003-272704 | | 9/2003 |
| JP | 2005-038722 | | 2/2005 |
| JP | 2005-243301 | | 9/2005 |
| JP | 2005-268017 | | 9/2005 |
| JP | WO-2006-027925 | * | 3/2006 |
| WO | 2005-018027 | | 2/2005 |
| WO | 2006-025707 | | 3/2006 |
| WO | WO-2006-123572 | * | 11/2006 |

* cited by examiner

PO₃            CoO₂

PO₃          CoO₂

CATHODE ACTIVE MATERIAL, ITS MANUFACTURING METHOD, CATHODE, ITS MANUFACTURING METHOD, AND SECONDARY BATTERY

CROSS REFERENCES TO RELATED APPLICATIONS

The present application is a continuation of U.S. application Ser. No. 11/763,222 filed on Jun. 14, 2007, which claims priority to Japanese Patent Application JP 2006-168090 filed in the Japanese Patent Office on Jun. 16, 2006, the entire contents of which are hereby incorporated by reference.

BACKGROUND

The present disclosure relates to a cathode active material, its manufacturing method, a cathode, its manufacturing method, and a secondary battery and, more particularly, to a cathode active material containing a lithium composite oxide.

In recent years, in association with the realization of advanced performance and multi-function of mobile equipment, the realization of a large capacitance of a secondary battery as a power source of such mobile equipment is earnestly requested. As a secondary battery which can satisfy such a request, a large attention has been paid to a non-aqueous electrolyte secondary battery in which lithium cobalt acid is used as a cathode, graphite is used as an anode, and an organic mixed solvent containing a lithium salt supporting electrolyte is used as an electrolyte.

In the non-aqueous electrolyte secondary battery in the related art which operates at the maximum voltage of 4.2V, the cathode active material such as lithium cobalt acid which is used as a cathode uses a capacitance of up to about 60% of its theoretical capacitance. Therefore, a residual capacitance can be used in principle by further raising the charge voltage. Actually, it has been known that a high energy density can be realized by raising an upper limit voltage upon charging to 4.25V or more (for example, refer to Patent Document 1: pamphlet of International Publication No. 03/019713). To satisfy a request for the realization of a larger capacitance, in recent years, an anode of a large capacitance using silicon Si, germanium Ge, tin Sn, or the like has also vigorously been examined.

The foregoing non-aqueous electrolyte secondary battery is mainly used in mobile equipment such as notebook-sized personal computers, cellular phones, or the like and is often subjected to a relatively high temperature environment for a long time due to heat which is generated from the equipment, heat in a moving vehicle, or the like. If the non-aqueous electrolyte secondary battery in a charging state is left in such an environment, a gas is generated by a reaction of the cathode and an electrolytic solution. Particularly, in the non-aqueous electrolyte secondary battery whose upper limit voltage upon charging has been set to 4.25V or more, the reaction of the cathode and the electrolytic solution increases and an amount of generated gas increases.

For example, in the case where the non-aqueous electrolyte secondary battery has been enclosed in a sheathing member made of a laminate film, if the gas is generated as mentioned above, sometimes, such a problem that the sheathing member is expanded, its thickness increases, and its size is out of the standard of a battery enclosing portion of electronic equipment occurs. Such a problem that an internal resistance of the battery increases by the reaction of the cathode and an electrolytic solution and it is difficult to take out a sufficient capacitance also occurs.

It is, therefore, desirable to provide a cathode active material, its manufacturing method, a cathode, its manufacturing method, and a secondary battery in which excellent high-temperature preserving characteristics can be obtained.

SUMMARY

According to an embodiment, there is provided a cathode active material, wherein at least one kind selected from the group consisting of sulfur S and phosphorus P is contained in a portion near a particle surface of a lithium composite oxide, and a content of the kind in the portion is larger than that in the particle of the lithium composite oxide.

According to another embodiment, there is provided a secondary battery comprising a cathode, an anode, and an electrolyte, wherein the cathode contains a cathode active material containing at least one kind selected from the group consisting of sulfur S and phosphorus P in a portion near a particle surface of a lithium composite oxide, and a content of the kind in the portion is larger than that in the particle of the lithium composite oxide.

According to another embodiment, there is provided a cathode containing a cathode active material containing at least one kind of sulfur S and phosphorus P in a portion near a particle surface of a lithium composite oxide, wherein a content of the kind in the portion near the particle surface of the lithium composite oxide is largest.

According to an embodiment, there is provided a secondary battery comprising a cathode, an anode, and an electrolyte, wherein the cathode contains a cathode active material containing at least one kind selected from the group consisting of sulfur S and phosphorus P in a portion near a particle surface of a lithium composite oxide, and a content of the kind in the portion is largest in the cathode.

According to another embodiment, there is provided a secondary battery comprising a cathode, an anode, and an electrolyte, wherein in a surface analysis by a Time-Of-Flight Secondary Ion Mass Spectroscopy (TOF-SIMS), the cathode has peaks of fragments of at least one or more secondary ions selected from positive secondary ions of $Li_4PO_4$, $Li_2CoPO_4$, $Li_2CoPH_2O_4$, $Li_3CoPO_4$, and $Li_3CoPO_4H$ and negative secondary ions of $PO_2$, $LiP_2O_4$, $Co_2PO_4$, $CoP_2O_5$, $CoP_2O_5H$, $CoP_2O_6$, and $CoP_2O_6H$.

According to another embodiment, there is provided a manufacturing method of a cathode active material, comprising the steps of: preparing a solution by mixing a lithium composite oxide particle, at least one kind selected from the group consisting of a sulfur-contained compound and a phosphorus-contained compound, and a solvent; and drying the solution.

According to an embodiment, there is provided a manufacturing method of a cathode, comprising: preparing a cathode mixture slurry by mixing a lithium composite oxide particle, at least one kind selected from the group consisting of a sulfur-contained compound and a phosphorus-contained compound, and a solvent; coating a cathode collector with the cathode mixture slurry; drying the cathode collector after preparing a cathode mixture slurry to from a cathode active material layer.

According to the embodiment, it is preferable that the lithium composite oxide has average compositions expressed by Formula 1.

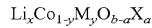 (Formula 1)

in Formula 1, M denotes an element of one kind selected from boron B, magnesium Mg, aluminum Al, silicon Si, phosphorus P, sulfur S, titanium Ti, chromium Cr, manganese Mn, iron Fe, cobalt Co, nickel Ni, copper Cu, zinc Zn, gallium Ga, yttrium Y, zirconium Zr, molybdenum Mo, silver Ag, tungsten W, indium In, tin Sn, lead Pb, and antimony Sb; X denotes a halogen element; x indicates a value within a range of $0.2<x\leq1.2$; y indicates a value within a range of $0\leq y\leq0.1$; b indicates a value within a range of $1.8\leq b\leq2.2$; and a indicates a value within a range of $0\leq a\leq1.0$.

According to the embodiment, it is preferable that the content of the kind in the portion lies within a range from 0.1 at % or more to less than 5 at % as a ratio to cobalt Co.

According to the embodiment, it is preferable that sulfur S is contained as $Li_2SO_4$ in the portion and phosphorus P is contained as $Li_3PO_4$ or $LiCoPO_4$ in the portion of the lithium composite oxide.

According to the embodiment, it is preferable that a center particle diameter ranges from 1 μm to 30 μm.

According to the embodiment, it is preferable that a specific surface area lies within a range from 0.1 $m^2$/g or more to less than 1 $m^2$/g.

According to the embodiment, it is preferable that the anode contains a carbon material or a metal material which can dope and dedope alkali metal ions. It is preferable that the carbon material contains at least one kind selected from a group containing graphite, easy-graphitizable carbon, and non-easy-graphitizable carbon. It is preferable that the metal material contains at least one kind selected from a group consisting of silicon Si, tin Sn, and germanium Ge.

According to the embodiment, it is preferable that the electrolyte contains a compound of fluorinated cyclic or chain-like carbonate in which a part or all of hydrogen is fluorinated. It is preferable that the compound is difluoro ethylene carbonate.

According to the embodiment, it is preferable that the open circuit voltage per pair of cathode and anode in a full charging state ranges from 4.25V to 4.6V. It is more preferable that the open circuit voltage per pair of cathode and anode in the full charging state lies within a range from 4.35V or more to 4.6V or less.

According to the embodiment, a thin coating film containing at least one kind of phosphorus P and sulfur S is formed on the surface of the lithium composite oxide particle. It is presumed that since an activity of the coating film to the electrolyte is low, the reaction of the cathode and the electrolytic solution in the high-temperature preserving state can be suppressed and the gas generation and the increase in internal resistance can be suppressed.

As described above, according to the embodiments, the gas generation and the increase in internal resistance due to the reaction of the cathode and the electrolytic solution in the high-temperature preserving state can be suppressed. Therefore, the secondary battery which is excellent in the high-temperature preserving characteristics can be provided.

Other features will be apparent from the following description taken in conjunction with the accompanying drawings, in which like reference characters designate the same or similar parts throughout the figures thereof.

Additional features and advantages are described herein, and will be apparent from, the following Detailed Description and the figures.

Figure 1:
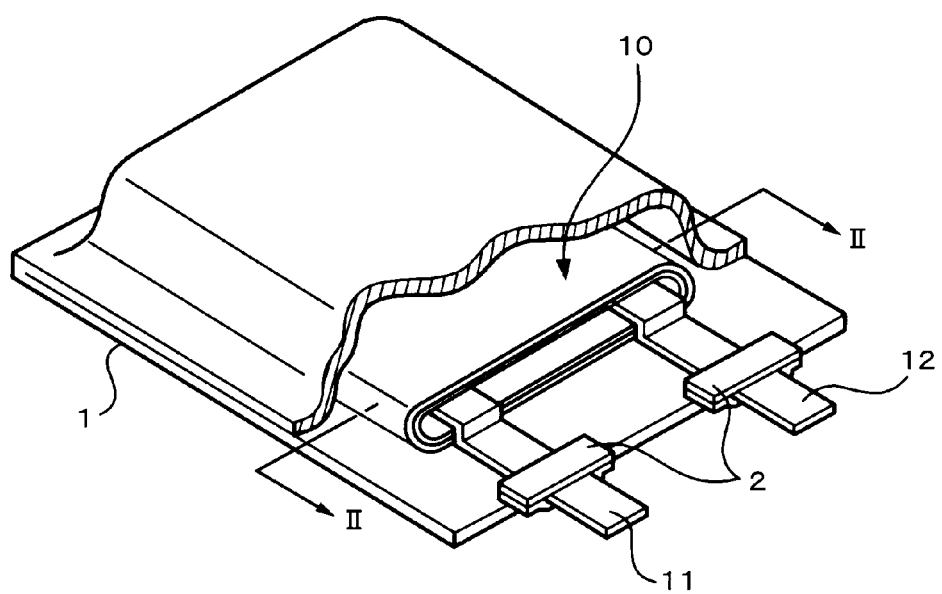
FIG. 1 is a perspective view showing an example of a construction of a secondary battery according to the first embodiment.

DETAILED DESCRIPTION (1) First Embodiment
(1-1) Cathode Active Material

In a cathode active material according to the first embodiment, a surface layer is formed in at least a part of a lithium composite oxide particle serving as a center portion. The lithium composite oxide is, for example, a lithium cobalt composite oxide containing lithium and cobalt. Average compositions of the lithium cobalt composite oxide are shown by, for example, Formula 1.

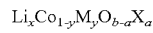

(Formula 1)

in Formula, M is an element of one kind selected from boron B, magnesium Mg, aluminum Al, silicon Si, phosphorus P, sulfur S, titanium Ti, chromium Cr, manganese Mn, iron Fe, cobalt Co, nickel Ni, copper Cu, zinc Zn, gallium Ga, yttrium Y, zirconium Zr, molybdenum Mo, silver Ag, tungsten W, indium In, tin Sn, lead Pb, and antimony Sb; X is a halogen element; x indicates a value within a range of $0.2<x\leq1.2$; y indicates a value within a range of $0\leq y\leq0.1$; b indicates a value within a range of $1.8\leq b\leq2.2$; and a indicates a value within a range of $0\leq a\leq1.0$.

The surface layer functions as a reaction suppressing layer and contains at least one or more kinds of sulfur S and phosphorus P. A content of at least one kind of sulfur S and phosphorus P in the surface of the lithium composite oxide particle is larger than that in the lithium composite oxide particle. Those materials are contained, for example, as a compound in the surface layer. More specifically speaking, sulfur S is contained as, for example, $Li_2SO_4$ in the surface layer. Phosphorus P is contained as, for example, $Li_3PO_4$ or $LiCoPO_4$ in the surface layer.

It is preferable that the content of the kind in the portion ranges from 0.1 at % to 5 at % as a ratio to cobalt Co of the cathode active material. This is because if it is set to be equal to 0.1 at % or more, excellent preserving characteristics can be obtained and if it is set to be smaller than 5 at %, an increase in internal resistance and a decrease in capacitance can be suppressed.

It is preferable that a center particle diameter of the cathode active material lies within a range from 1 μm or more to less than 30 μm. This is because if it is set to be equal to 1 μm or more, the reaction of the cathode and the electrolytic solution is suppressed and an increase in gas generation amount can be suppressed, and if it is set to be less than 30 μm, the sufficient capacitance and excellent load characteristics can be obtained.

It is preferable that a specific surface area lies within a range from 0.1 m$^2$/g or more to less than 1 m$^2$/g. This is because if it is set to be equal to 0.1 m$^2$/g or more, the sufficient capacitance and the excellent load characteristics can be obtained and, if it is set to be less than 1 m$^2$/g, the reaction of the cathode and the electrolytic solution is suppressed and the increase in gas generation amount can be suppressed.

The cathode active material is obtained by, for example, inserting the lithium composite oxide particle into an aqueous solution containing at least one kind of a sulfur-contained compound and a phosphorus-contained compound and kneading it, and drying it after that. As a drying method, for example, a hot air type fixed shelf drier, a spray dry, or the like can be used. A surface product can be also stabilized by thermally processing an obtained dried substance. As a sulfur-contained compound, one, two, or more kinds of sulfur-contained compounds can be used. As a sulfur-contained compound, for example, sulfuric acid, sulfurous acid, ammonium sulfate, ammonium hydrogensulfate, organic sulfate, or the like can be mentioned. As a phosphorus-contained compound, one, two, or more kinds of phosphorus-contained compounds can be used. As a phosphorus-contained compound, phosphoric acid, phosphorous acid, hypophosphorous acid, ammonium phosphate, ammonium hydrogenphosphate, organic phosphate, or the like can be mentioned.

As a method of confirming that at least one kind of sulfur S and phosphorus P exists in the surface, in a surface analysis of an SEM-EDS (Scanning Electron Microscopy-Energy Dispersion X-ray Spectrometry), a method of confirming by comparing an atom ratio of at least one kind of sulfur S and phosphorus P existing in the surface to cobalt Co with a ratio of materials used for manufacturing the cathode active material can be mentioned. The above confirmation can be also similarly made by using an XPS (X-ray Photoelectron Spectroscopy). After the cathode active material was embedded into the resin and its cross sectional surface was exposed, distribution in the cross sectional surface can be confirmed by the TOF-SIMS (Time-Of-Flight Secondary Ion Mass Spectroscopy). Further, a surface compound can be identified by a measurement of XRD (X-Ray Diffraction) or a measurement of the TOF-SIMS.

(1-2) Construction of Secondary Battery

Subsequently, an example of a construction of a secondary battery according to the first embodiment of the invention will be described with reference to FIGS. 1 and 2.

FIG. 1 is a perspective view showing the example of the construction of the secondary battery according to the first embodiment. The secondary battery has a construction in which a battery element 10 to which a cathode lead 11 and an anode lead 12 have been attached is enclosed in a film-shaped sheathing member 1.

The cathode lead 11 and the anode lead 12 are in, for example, a strip-shape and are led out from the inside of the sheathing member 1 toward the outside, for example, in the same direction. The cathode lead 11 is made of a metal material such as aluminum or the like. The anode lead 12 is made of a metal material such as nickel Ni or the like.

The sheathing member 1 has a structure in which, for example, an insulating layer, a metal layer, and an outermost layer are laminated in this order and adhered by laminate work or the like. The sheathing member 1 is constructed in such a manner that, for example, the side of the insulating layer is set to the inside and outer edge portions are mutually adhered by melt-bonding or an adhesive agent.

The insulating layer is made of a polyolefin resin such as polyethylene, polypropylene, denatured polyethylene, denatured polypropylene, their copolymer, or the like. This is because a moisture permeability can be reduced and excellent air-tightness is obtained. The metal layer is made of foil-shaped or plate-shaped aluminum, stainless steel, nickel, iron, or the like. The outermost layer can be made of, for example, a resin similar to that of the insulating layer or may be made of nylon or the like. This is because an intensity against a tear, piercing, or the like can be enhanced. The sheathing member 1 may have a layer other than the insulating layer, the metal layer, and the outermost layer.

An adhesive film 2 for improving adhesion between the cathode lead 11 and the inside of the sheathing member 1 and adhesion between the anode lead 12 and the inside of the sheathing member 1 and preventing invasion of the outside atmosphere has been inserted between the sheathing member 1 and each of the cathode lead 11 and the anode lead 12. The adhesive film 2 is made of a material having adhesion against each of the cathode lead 11 and the anode lead 12. For example, if the cathode lead 11 and the anode lead 12 are made of the foregoing metal material, it is preferable that they are made of the polyolefin resin such as polyethylene, polypropylene, denatured polyethylene, denatured polypropylene, or the like.

Figure 2:
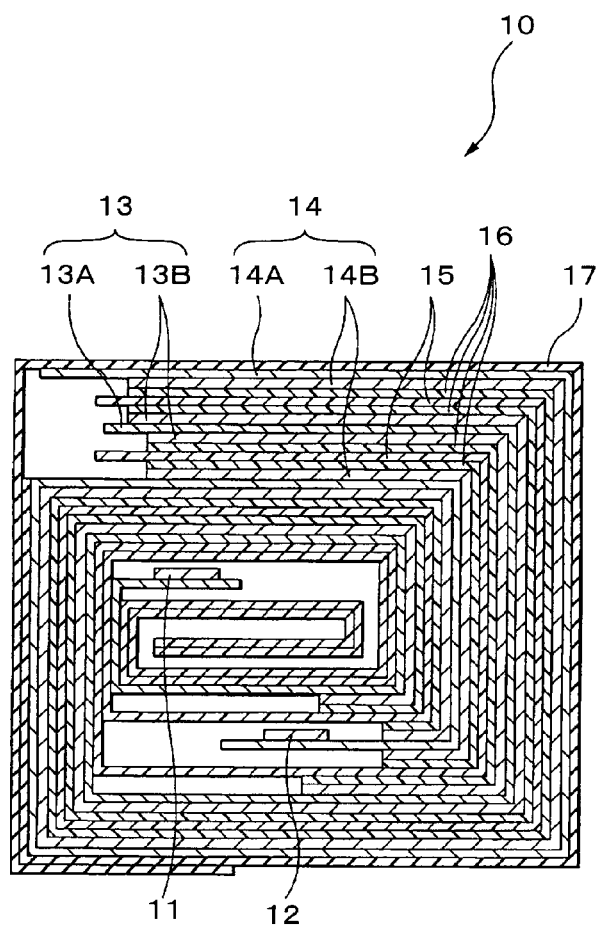
FIG. 2 is a cross sectional view taken along the line II-II in a battery element 10 shown in FIG. 1.

FIG. 2 is a cross sectional view taken along the line II-II in the battery element 10 shown in FIG. 1. The battery element 10 is formed by laminating a cathode 13 and an anode 14 through a separator 15 and an electrolyte 16 and winding them. An outermost peripheral portion of the battery element 10 is protected by a protecting tape 17.

The cathode 13 has, for example, a cathode collector 13A and cathode active material layers 13B provided on both surfaces of the cathode collector 13A. The cathode collector 13A is made of, for example, a metal foil such as an aluminum foil or the like.

The cathode active material layer 13B contains: the cathode active material according to the first embodiment; and a conductive material such as a carbon material or the like and a binder such as polyvinylidene fluoride, polytetrafluoro ethylene, or the like as necessary.

In addition to the cathode active material according to the first embodiment, the cathode active material layer 13B may also contain another cathode active material. As another cathode active material, for example, a lithium nickel composite oxide containing lithium and nickel, a lithium manganese composite oxide having a spinel structure containing lithium and manganese, or a phosphate compound containing lithium and iron can be mentioned.

In a surface analysis by the Time-Of-Flight Secondary Ion Mass Spectroscopy (TOF-SIMS), the cathode 13 has a peak of a fragment of at least one or more secondary ions selected from positive secondary ions of $Li_4PO_4$, $Li_2CoPO_4$, $Li_2CoPH_2O_4$, $Li_3CoPO_4$, and $Li_3CoPO_4H$ and negative secondary ions of $PO_2$, $LiP_2O_4$, $Co_2PO_4$, $CoP_2O_5$, $CoP_2O_5H$, $CoP_2O_6$, and $CoP_2O_6H$.

In a manner similar to the cathode 13, the anode 14 has, for example, an anode collector 14A and anode active material layers 14B provided on both surfaces of the anode collector 14A. The anode collector 14A is made of, for example, a metal foil such as a copper foil or the like.

The anode active material layer 14B is formed so as to contain one, two, or more kinds of anode materials in/from which lithium can be doped and dedoped as an anode active material. The anode active material layer 14B may contain a conductive material and a binder as necessary.

As an anode material in/from which lithium can be doped and dedoped, for example, a carbon material such as graphite, non-easy-graphitizable carbon, easy-graphitizable carbon, or the like can be mentioned. In the carbon material, any one kind of elements can be solely used, two or more kinds of elements may be mixed and used, or two or more kinds of elements having different mean diameters can be also mixed and used.

As an anode material in/from which lithium can be doped and dedoped, a material containing a metal element or a semimetal element which can form an alloy together with lithium as a component element can be mentioned. Specifically speaking, a simple substance, an alloy, or a compound of the metal element which can form an alloy together with lithium, a simple substance, an alloy, or a compound of the semimetal element which can form an alloy together with lithium, or a material having phases of one, two, or more kinds of them in at least a part can be mentioned.

As such a metal element or a semimetal element, for example, the following elements can be mentioned: tin Sn; lead Pb; aluminum; indium In; silicon Si; zinc Zn; antimony Sb; bismuth Bi; cadmium Cd; magnesium Mg; boron B; gallium Ga; germanium Ge; arsenic As; silver Ag; zirconium Zr; yttrium Y; or hafnium Hf. Among them, a metal element or a semimetal element of Group 14 in a long period type periodic table is preferable. Silicon Si or tin Sn is particularly preferable. This is because in the case of silicon Si or tin Sn, an ability of doping and dedoping lithium is high and a high energy density can be obtained.

As an alloy of silicon, for example, an alloy containing at least one kind selected from a group containing tin Sn, nickel Ni, copper Cu, iron Fe, cobalt Co, manganese Mn, zinc Zn, indium In, silver Ag, titanium Ti, germanium Ge, bismuth Bi, antimony Sb, and chromium Cr can be mentioned as a second component element other than silicon. As an alloy of tin Sn, for example, an alloy containing at least one kind selected from a group containing silicon Si, nickel Ni, copper Cu, iron Fe, cobalt Co, manganese Mn, zinc Zn, indium In, silver Ag, titanium Ti, germanium Ge, bismuth Bi, antimony Sb, and chromium Cr can be mentioned as a second component element other than tin Sn.

As a compound of silicon Si or a compound of tin Sn, for example, a compound containing oxygen O or carbon C can be mentioned. In addition to silicon Si or tin Sn, the foregoing second component element can be also contained.

As a separator 15, any material can be used so long as it is electrically stable, is chemically stable against the cathode active material, the anode active material, or a solvent, and does not have electric conductivity. For example, a high molecular nonwoven fabric cloth, a porous film, or a paper-like sheet made of fiber of glass or ceramics can be used, or a sheet obtained by laminating a plurality of those materials can be also used. Particularly, it is preferable to use a porous polyolefin film. A material obtained by combining such a film with a heat-resistant material made of fiber of polyimide, glass, or ceramics, or the like.

The electrolyte 16 contains an electrolytic solution and a holding member containing a high molecular compound which holds the electrolytic solution and is in what is called a gel-state. The electrolytic solution contains an electrolytic salt and a solvent which dissolves the electrolytic salt. As an electrolytic salt, for example, lithium salt such as $LiClO_4$, $LiPF_6$, $LiBF_4$, $LiN(SO_2CF_3)_2$, $LiN(SO_2C_2F_5)_2$, $LiAsF_6$, or the like can be mentioned. Although any one kind of them can be used as an electrolytic salt, two or more kinds of them may be mixed and used.

As a solvent, for example, the following solvents can be mentioned: a lactone system solvent such as γ-butyrolactone, γ-valerolactone, δ-valerolactone, ε-caprolactone, or the like; a carbonic ester system solvent such as ethylene carbonate, propylene carbonate, butylene carbonate, vinylene carbonate, dimethyl carbonate, ethylmethyl carbonate, diethyl carbonate, or the like; an ether system solvent such as 1,2-dimethoxy ethane, 1-ethoxy-2-methoxy ethane, 1,2-diethoxy ethane, tetrahydrofuran, 2-methyl tetrahydrofuran, or the like; a nitrile system solvent such as acetonitrile or the like; a sulforan system solvent; a phosphoric ester solvent of a phosphate class or the like; or a non-aqueous solvent of a pyrrolidone class or the like. Any one kind of those solvents can be solely used as a solvent or two or more kinds of them can be also mixed and used.

It is preferable that the solvent contains a compound of fluorinated cyclic or chain-like carbonate in which a part or all of hydrogen is fluorinated. It is preferable to use difluoro ethylene carbonate as a fluorinated compound. This is because even in the case where the anode 14 containing a compound such as silicon Si, tin Sn, germanium Ge, or the like is used as an anode active material, charge/discharge cycle characteristics can be improved and, particularly, difluoro ethylene carbonate is excellent in cycle characteristics improving effect.

The high molecular compound may be a compound which absorbs the solvent and becomes a gel state. For example, the following compounds can be mentioned: a fluorine system high molecular compound such as polyvinylidene fluoride, copolymer of vinylidene fluoride and hexafluoro propylene, or the like; an ether system high molecular compound such as polyethylene oxide, bridge member containing polyethylene oxide, or the like; a compound containing polyacrylo nitrile, polypropylene oxide, or polymethyl methacrylate as a repetitive unit; and the like. As a high molecular compound, any one kind of those compound can be solely used or two or more kinds of them may be mixed and used.

Particularly, the fluorine system high molecular compound is preferable from a viewpoint of the oxidation-reduction stability. Among them, the copolymer containing vinylidene fluoride and hexafluoro propylene as components is preferable. Further, the copolymer may contain the following material as a component: monoester of unsaturated dibasic acid such as monomethyl maleic ester or the like; ethylene halide such as ethylene chloride trifluoride or the like; cyclic carbonate of an unsaturated compound such as vinylene carbonate or the like; acrylvinyl monomer containing an epoxy radical; or the like. This is because the advanced characteristics can be obtained.

In the secondary battery having the above construction, an open circuit voltage per pair of cathode and anode in the full charging state is set to, for example, 4.2V or a value over 4.2V. When the open circuit voltage is set to a value over 4.2V, preferably, the open circuit voltage lies within a range from 4.25V or more to 4.6V or less, much preferably, a range from 4.35V or more to 4.6V or less. This is because if an upper limit charge voltage of the secondary battery is set to a high voltage, a using ratio of the cathode active material can be increased, a larger amount of energy can be extracted, and if it is set to 4.6V or less, the oxidation of the separator 15 can be suppressed.

(1-3) Manufacturing Method of Secondary Battery

An example of a manufacturing method of the secondary battery according to the first embodiment will now be described.

First, for example, the cathode active material layer 13B is formed on the cathode collector 13A, thereby manufacturing the cathode 13. The cathode active material layer 13B is formed as follows. For example, a cathode mixture is adjusted by mixing powder of the cathode active material, a conductive material, and a binder. Thereafter, the cathode mixture is dispersed into the solvent such as N-methyl-2-pyrrolidone or the like, thereby forming a paste-like cathode mixture slurry. The cathode collector 13A is coated with the cathode mixture slurry and the solvent is dried. Thereafter, the collector is compression-molded. For example, in a manner similar to the cathode 13, the anode active material layer 14B is formed on the anode collector 14A, thereby manufacturing the anode 14. Subsequently, the cathode lead 11 is attached to the cathode collector 13A and the anode lead 12 is attached to the anode collector 14A.

Subsequently, an electrolytic solution and a high molecular compound are mixed by using a mixing solvent. The upper surface of the cathode active material layer 13B and the upper surface of the anode active material layer 14B are coated with the mixed solution and the mixing solvent is volatilized, thereby forming the electrolyte 16. Subsequently, the cathode 13, separator 15, anode 14, and separator 15 are sequentially laminated and wound. The protecting tape 17 is adhered to the outermost peripheral portion, thereby forming the battery element 10. After that, the battery element 10 is sandwiched between the sheathing members 1 and the outer edge portions of the sheathing members 1 are thermally melt-bonded. In this instance, the adhesive films 2 are inserted between the cathode lead 11 and the sheathing member 1 and between the anode lead 12 and the sheathing member 1, respectively. Thus, the secondary battery shown in FIG. 1 is obtained.

The invention is not limited to the structure in which after the electrolyte 16 was formed on the cathode 13 and the anode 14, they are wound. It is also possible to use a structure in which after the cathode 13 and the anode 14 were wound through the separator 15 and they are sandwiched between the sheathing members 1, an electrolytic composition containing an electrolytic solution and a monomer of a high molecular compound is injected, and the monomer is polymerized in the sheathing member 1.

According to such a secondary battery, when it is charged, for example, lithium ions are dedoped from the cathode 13 and doped into the anode 14 through the electrolyte 16. On the other hand, when the battery is discharged, for example, lithium ions are dedoped from the anode 14 and doped into the cathode 13 through the electrolyte 16.

As described above, according to the first embodiment, since the surface layer is provided in at least a part of the lithium composite oxide particle serving as a center portion, when the secondary battery in the charging state was preserved under a high-temperature condition, the generation of the gas due to the reaction of the cathode 31 and the electrolytic solution can be suppressed. The increase in internal resistance due to the reaction of the cathode 31 and the electrolytic solution can be also suppressed.

Even in the case where the open circuit voltage per pair of cathode and anode in the full charging state is set to, for example, a value over 4.2V, that is, a value within a range from 4.25V or more to 4.6V or less or a range from 4.35V or more to 4.6V or less, a using ratio of the cathode active material is increased, and an electric potential of the cathode 13 is raised, the gas generation due to the reaction of the cathode 13 and the electrolytic solution can be suppressed. That is, the larger amount of energy can be extracted and the high-temperature preserving characteristics can be remarkably improved.

Even in the secondary battery in which graphite which has widely been used in the related art is used as an anode active material, the increase in thickness of battery in the high-temperature preservation can be suppressed. Such a suppressing effect is further typically obtained in the secondary battery in which the anode 14 using a compound such as silicon Si, tin Sn, germanium Ge, or the like is used as an anode active material is used and fluorinated cyclic or chain-like ester is used as an electrolyte 16.

(2) Second Embodiment

A second embodiment is described below. A secondary battery according to the second embodiment uses an electrolytic solution in place of the gel electrolyte 16 in the secondary battery of the first embodiment. In this case, the electrolytic solution is impregnated into the separator 15. As an electrolytic solution, an electrolytic solution similar to that in the foregoing first embodiment can be used.

The secondary battery having such a construction can be manufactured, for example, as follows. In a manner similar to the foregoing first embodiment except that the creation of the gel electrolyte 16 is omitted, the battery element 10 is formed by winding the cathode 13 and the anode 14, the battery element 10 is sandwiched between the sheathing members 1, thereafter, the electrolytic solution is injected, and the sheathing member 1 is sealed.

In the second embodiment, an effect similar to that in the foregoing first embodiment can be obtained.

(3) Third Embodiment

(3-1) Cathode Active Material

Since a cathode active material according to the third embodiment is similar to that in the foregoing first embodiment, its description is omitted.

(3-2) Construction of Secondary Battery

A Construction of a secondary battery according to the third embodiment is described below with reference to FIGS. 3 and 4.

Figure 3:
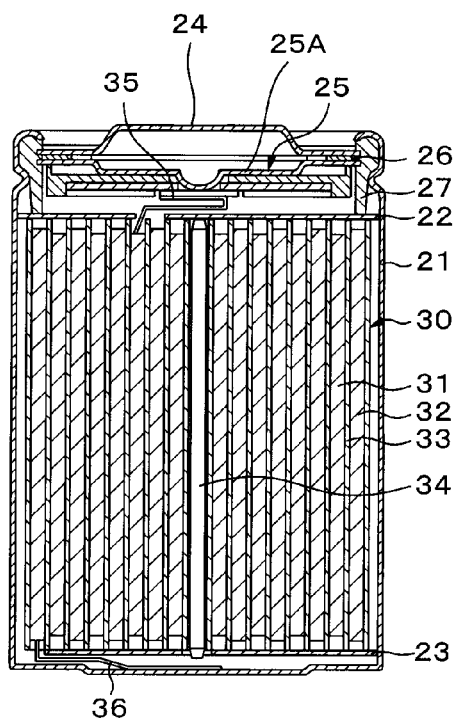
FIG. 3 is a cross sectional view showing an example of a construction of a secondary battery according to the third embodiment.

FIG. 3 is a cross sectional view showing an example of the construction of the secondary battery according to the third embodiment. The secondary battery is what is called a cylindrical type. In an almost hollow cylindrical battery can 21, the secondary battery has a winded electrode member 30 in which a belt-shaped cathode 31 and a belt-shaped anode 32 have been wound through a separator 33. An electrolytic solution as a liquid electrolyte has been impregnated in the separator 33. The battery can 21 is made of, for example, iron Fe plated with nickel Ni. One end portion of the battery can 21 is closed and the other end portion is open. In the battery can 21, a pair of insulating plates 22 and 23 are arranged perpendicularly to a winded peripheral surface so as to sandwich the winded electrode member 30.

A battery cap 24 and a relief valve mechanism 25 and a thermally-sensitive resistive (PTC: Positive Temperature Coefficient) element 26 provided in the battery cap 24 are attached to the open edge portion of the battery can 21 by being caulked through a gasket 27. The inside of the battery can 21 has been sealed. The battery cap 24 is made of, for example, a material similar to that of the battery can 21. The relief valve mechanism 25 is electrically connected to the battery cap 24 through the PTC element 26. When an inner pressure of the battery rises to a predetermined value or more by an internal short-circuit, heating from the outside, or the like, a disk plate 25A is reversed, thereby disconnecting the electric connection between the battery cap 24 and the winded electrode member 30. When a temperature rises, the PTC element 26 limits a current by an increase in resistance value, thereby preventing an abnormal heat generation that is caused by the large current. The gasket 27 is made of, for example, an insulating material and its surface is coated with asphalt.

The winded electrode member 30 is wound around, for example, a center pin 34 as a center. A cathode lead 35 made of aluminum Al or the like is connected to the cathode 31 of the winded electrode member 30. An anode lead 36 made of nickel Ni or the like is connected to the anode 32. The cathode lead 35 is welded to the relief valve mechanism 25, so that it is electrically connected to the battery cap 24. The anode lead 36 is welded to the battery can 21 and is electrically connected thereto.

Figure 4:
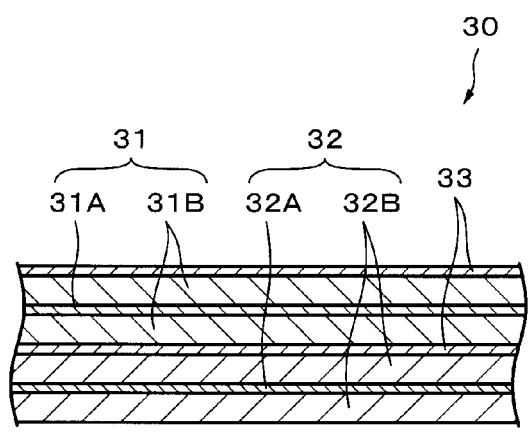
FIG. 4 is a cross sectional view enlargedly showing a part of a winded electrode member 30 shown in FIG. 3.

FIG. 4 is a cross sectional view enlargedly showing a part of the winded electrode member 30 shown in FIG. 3. The winded electrode member 30 is obtained by laminating the cathode 31 and the anode 32 through the separator 33 and winding them.

The cathode 31 has, for example, a cathode collector 31A and cathode active material layers 31B provided on both surfaces of the cathode collector 31A. The anode 32 has, for example, an anode collector 32A and anode active material layers 32B provided on both surfaces of the anode collector 32A. Constructions of the cathode collector 31A, cathode active material layers 31B, anode collector 32A, anode active material layers 32B, separator 33, and electrolytic solution are similar to those of the cathode collector 13A, cathode active material layers 13B, anode collector 14A, anode active material layers 14B, separator 15, and electrolytic solution in the foregoing first embodiment, respectively.

(3-3) Manufacturing Method of Secondary Battery

An example of a manufacturing method of the secondary battery according to the third embodiment is described below.

The cathode 31 is manufactured as follows. First, a cathode mixture is adjusted by mixing the cathode active material, a conductive material, and a binder. The cathode mixture is dispersed into the solvent such as 1-methyl-2-pyrrolidone or the like, thereby forming a cathode mixture slurry. Subsequently, the cathode collector 31A is coated with the cathode mixture slurry and the solvent is dried. Thereafter, the collector is compression-molded by a roll pressing machine or the like, thereby forming the cathode active material layers 31B and obtaining the cathode 31.

The anode 32 is manufactured as follows. First, an anode mixture is adjusted by mixing the anode active material and a binder. The anode mixture is dispersed into the solvent such as 1-methyl-2-pyrrolidone or the like, thereby forming an anode mixture slurry. Subsequently, the anode collector 32A is coated with the anode mixture slurry and the solvent is dried. Thereafter, the collector is compression-molded by the roll pressing machine or the like, thereby forming the anode active material layers 32B and obtaining the anode 32.

Subsequently, the cathode lead 35 is attached to the cathode collector 31A by welding or the like and the anode lead 36 is attached to the anode collector 32A by welding or the like. Thereafter, the cathode 31 and the anode 32 are wound through the separator 33. A front edge portion of the cathode lead 35 is welded to the relief valve mechanism 25 and a front edge portion of the anode lead 36 is welded to the battery can 21. The wound cathode 31 and anode 32 are sandwiched between the pair of insulating plates 22 and 23 and enclosed in the battery can 21. After the cathode 31 and the anode 32 were enclosed in the battery can 21, an electrolyte is injected into the battery can 21 and impregnated into the separator 33. Thereafter, the battery cap 24, relief valve mechanism 25, and PTC element 26 are fixed to the open edge portion of the battery can 21 by being caulked through the gasket 27. In this manner, the secondary battery shown in FIG. 3 is manufactured.

In the third embodiment, effects similar to those in the foregoing first embodiment can be obtained.

(4) Fourth Embodiment

A secondary battery according to the fourth embodiment has a construction similar to that in the foregoing first embodiment except for cathode active material layers. The same or similar component elements as those in the foregoing first embodiment are designated by the same reference numerals and explanation is made below.

In the cathode active material layer 13B, at least one kind selected from the group consisting of sulfur S and phosphorus P is contained in a portion near the particle surface of the lithium composite oxide and a content of the kind in the portion is largest in the cathode active material layer 13B. At least one kind of sulfur S and phosphorus P is contained as, for example, a compound in the cathode active material layer 13B. More specifically speaking, sulfur S is contained as, for example, $Li_2SO_4$ in the cathode active material layer 13B and phosphorus P is contained as, for example, $Li_3PO_4$ or $LiCoPO_4$ in the cathode active material layer 13B. The lithium composite oxide is similar to that in the foregoing first embodiment.

It is preferable that the content of the kind in the portion lies within a range from 0.1 at % or more to less than 5 at % as a ratio to cobalt Co of the cathode active material. This is because if it is set to a value of 0.1 at % or more, the excellent preserving characteristics can be obtained and if it is set to a value less than 5 at %, the increase in internal resistance and the decrease in capacitance can be suppressed.

It is preferable that a center particle diameter of the cathode active material lies within a range from 1 μm or more to less than 30 μm. This is because if it is set to a value of 1 μm or more, the reaction of the cathode and the electrolytic solution can be suppressed, the increase in gas generation amount can be suppressed, and if it is set to a value less than 30 μm, the sufficient capacitance and the excellent load characteristics can be obtained.

It is preferable that a specific surface area lies within a range from 0.1 $m^2/g$ or more to less than 1 $m^2/g$. This is because if it is set to a value of 0.1 $m^2/g$ or more, the sufficient capacitance, the excellent load characteristics can be obtained, and if it is set to a value less than 1 $m^2/g$, the reaction of the cathode and the electrolytic solution can be suppressed, and the increase in gas generation amount can be suppressed.

As a method of confirming that in the cathode active material layer 13B, a large amount of sulfur S or phosphorus P exist in the portion near the particle surface of the lithium composite oxide, a method whereby the cathode 13 is embedded into a resin and its cross sectional surface is exposed and, thereafter, distribution in the cross sectional surface is confirmed by the TOF-SIMS can be mentioned. It can be also confirmed by analyzing the elements by the XPS while argon-sputtering the surface of the cathode.

In a surface analysis by a Time-Of-Flight Secondary Ion Mass Spectroscopy (TOF-SIMS), the cathode active material layer 13B has a peak of a fragment of at least one or more secondary ions selected from positive secondary ions of $Li_4PO_4$, $Li_2CoPO_4$, $Li_2CoPH_2O_4$, $Li_3CoPO_4$, and $Li_3CoPO_4H$ and negative secondary ions of $PO_2$, $LiP_2O_4$, $Co_2PO_4$, $CoP_2O_5$, $CoP_2O_5H$, $CoP_2O_6$, and $CoP_2O_6H$.

The cathode active material layer 13B can be manufactured, for example, as follows. By mixing the cathode active material, binder, conductive material, and at lease one kind of a sulfur-contained compound and a phosphorus-contained compound, a cathode mixture is adjusted and, thereafter, kneaded in N-methylpyrrolidone as a dispersion medium, thereby obtaining a paste-like cathode mixture slurry. The cathode collector 13A is coated with the cathode mixture slurry, the slurry is dried, and the collector is compression-molded. In this manner, the cathode active material layer 13B is manufactured. As a sulfur-contained compound and a phosphorus-contained compound, for example, compounds similar to those in the foregoing first embodiment can be used.

In the fourth embodiment, effects similar to those in the foregoing first embodiment can be obtained.

EXAMPLES

Although the embodiments are specifically described hereinbelow with respect to Examples, they are not limited only to those Examples.

In Examples 1 to 8 and Comparison 1, the cathode active material containing sulfur S or phosphorus P in the particle surface of the lithium composite oxide is used, secondary batteries are manufactured while changing the content of sulfur S or phosphorus P to cobalt Co in the cathode active material, and the high-temperature preserving characteristics are evaluated.

Example 1

A cathode is manufactured as follows. First, $LiCoO_2$ of 5000 g in which a center particle diameter is equal to 12 μm and a specific surface area is equal to 0.20 m²/g and $(NH_4)_2SO_4$ of 34 g are mixed, the water is added, and they are kneaded into a slurry shape. After that, the slurry is dried in a drier of 130° C., thermally processed for 3 hours at 900° C. in the air flow, thereafter broken, and sieved into the particles of 75 μm or less, thereby manufacturing a cathode active material. A center particle diameter of the cathode active material is equal to 12.5 μm and a specific surface area is equal to 0.23 m²/g.

The center particle diameter is what is called a D50 particle diameter and is equal to a middle diameter (particle diameter which coincides with an intermediate value of 50% of particle diameter distribution) of the particle diameter measured by a laser diffracting method (JIS Z8825-1). The specific surface area is measured by a BET (Brunauer Emmett-Teller) method (JIS Z8830). In Examples and Comparisons, which will be described hereinbelow, the center particle diameters and the specific surface areas are also obtained in a manner similar to that mentioned above.

Subsequently, with respect to the manufactured cathode active material, element distribution is surface-analyzed by the SEM-EDS. Thus, sulfur S elements are detected at a larger mole ratio to an amount of the materials used for manufacturing the cathode active material and it has been found that many sulfur S elements exist in the surface of the cathode active material.

Subsequently, the manufactured cathode active material of 96 weight parts, polyvinylidene fluoride of 3 weight parts as a binder, and ketjen black of 1 weight part as a conductive material are kneaded in N-methylpyrrolidone as a dispersion medium, thereby obtaining a cathode mixture slurry. The cathode collector having a thickness of 30 μm and made of aluminum is coated with the cathode mixture slurry, the slurry is dried, and the collector is compression-molded by the roll pressing machine, thereby forming a cathode active material layer and manufacturing the cathode.

The cathode manufactured as mentioned above and a lithium metal anode are laminated through a separator as a film made of polypropylene and wound in the longitudinal direction. After that, a protecting tape is adhered to the outermost peripheral portion, thereby manufacturing the battery element.

Finally, the manufactured battery element is sandwiched between the sheathing members each made of an aluminum laminate film obtained by sandwiching an aluminum foil by polyolefin. Outer peripheral edge portions excluding one side are thermally melt-bonded into a sack shape. The battery element is enclosed in the sheathing member. Subsequently, the electrolytic solution is injected into the sheathing member from the non-bonded portion and the non-bonded portion of the sheathing member is thermally melt-bonded and sealed. As an electrolytic solution, $LiPF_6$ as a lithium salt is dissolved at a ratio of 1.0 mol/dm³ into a solvent obtained by mixing ethylene carbonate and dimethyl carbonate at a mass ratio of 1:1 and an obtained solution is used. In this manner, the flat secondary battery of the 500 mAh class is manufactured.

Example 2

A cathode active material is manufactured as follows. $LiCoO_2$ of 5000 g in which a center particle diameter is equal to 12 μm and a specific surface area is equal to 0.20 m²/g and $(NH_4)_2SO_4$ of 69 g are mixed, the water is added, and they are kneaded into a slurry shape. After that, the slurry is dried in the drier of 130° C., thermally processed for 3 hours at 900° C. in the air flow, thereafter broken, and sieved into the particles of 75 μm or less, thereby manufacturing the cathode active material. A center particle diameter of the cathode active material is equal to 11.6 μm and a specific surface area is equal to 0.22 m²/g. Subsequently, with respect to the manufactured cathode active material, element distribution is surface-analyzed by the SEM-EDS. Thus, the sulfur S elements are detected at a larger mole ratio to the amount of the materials used for manufacturing the cathode active material and it has been found that many sulfur S elements exist in the surface of the cathode active material.

A secondary battery is manufactured in substantially the same manner as that of foregoing Example 1 except that the cathode active material manufactured as mentioned above is used.

Example 3

A cathode active material is manufactured as follows. $LiCoO_2$ of 5000 g in which a center particle diameter is equal to 12 μm and a specific surface area is equal to 0.20 m²/g and $(NH_4)_2HPO_4$ of 23 g are mixed, the water is added, and they are kneaded into a slurry shape. After that, the slurry is dried in the drier of 130° C., thermally processed for 3 hours at 900° C. in the air flow, thereafter broken, and sieved into the particles of 75 μm or less, thereby manufacturing the cathode active material. A center particle diameter of the cathode active material is equal to 11.8 μm and a specific surface area is equal to 0.23 m²/g. Subsequently, with respect to the manufactured cathode active material, element distribution is surface-analyzed by the SEM-EDS.

Thus, the phosphorus P elements are detected at a larger mole ratio to the amount of the materials used for manufacturing the cathode active material and it has been found that many phosphorus P elements exist in the surface of the cathode active material.

A secondary battery is manufactured in substantially the same manner as that of foregoing Example 1 except that the cathode active material manufactured as mentioned above is used.

Example 4

A cathode active material is manufactured as follows. $LiCoO_2$ of 5000 g in which a center particle diameter is equal to 12 μm and a specific surface area is equal to 0.20 $m^2/g$ and $(NH_4)_2HPO_4$ of 47 g are mixed, the water is added, and they are kneaded into a slurry shape. After that, the slurry is dried in the drier of 130° C., thermally processed for 3 hours at 900° C. in the air flow, thereafter broken, and sieved into the particles of 75 μm or less, thereby manufacturing the cathode active material. A center particle diameter of the cathode active material is equal to 11.8 μm and a specific surface area is equal to 0.23 $m^2/g$. Subsequently, with respect to the manufactured cathode active material, element distribution is surface-analyzed by the SEM-EDS. Thus, the phosphorus P elements are detected at a larger mole ratio to the amount of the materials used for manufacturing the cathode active material and it has been found that many phosphorus P elements exist in the surface of the cathode active material.

Figure 5:
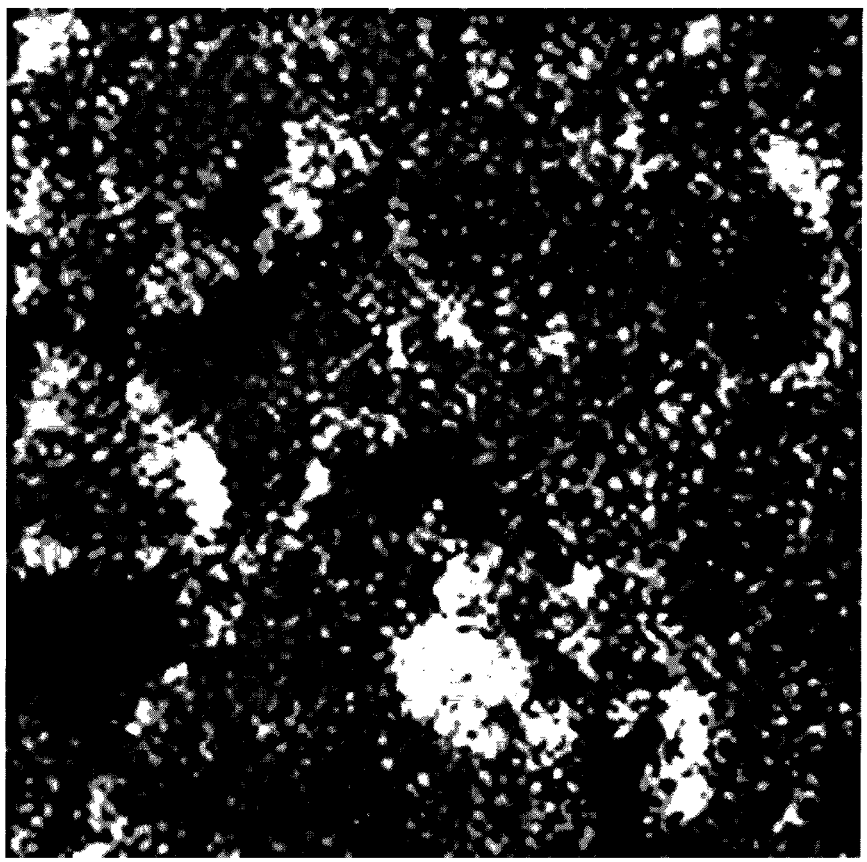
FIG. 5 is a surface diagram showing a result of a TOF-SIMS surface analysis of a cathode active material in Example 4.

Subsequently, the cathode active material is analyzed by the TOF-SIMS as follows. The cathode active material powder is embedded with a resin and cross-sectional work-processed by an argon ion milling apparatus. Thereafter, the TOF-SIMS analysis is performed. In the TOF-SIMS analysis, "TOF-SIMSV" made by ION-TOF Co., Ltd. is used. Measuring conditions are set as follows: primary ions are set to 197Au+; an accelerating voltage of an ion gun is set to 25 keV; unbunching; an irradiation ion current is set to 0.5 pA (measured by a pulse beam); a pulse frequency is set to 50 kHz; a mass range is set to 1 to 200 amu; a scanning range is set to 25×25 μm; and spatial resolution is set to 0.2 um. An analysis result is shown in FIG. 5. In FIG. 5, a gray portion shows an area containing $CoO_2$ and a white portion shows an area containing $PO_3$. It will be understood from FIG. 5 that many phosphorus compounds exist in the surface of $LiCoO_2$ particle.

Subsequently, a secondary battery is manufactured in substantially the same manner as that of foregoing Example 1 except that the cathode active material manufactured as mentioned above is used.

Example 5

A cathode active material is manufactured as follows. $LiCoO_2$ of 5000 g in which a center particle diameter is equal to 12 μm and a specific surface area is equal to 0.20 $m^2/g$, $H_3PO_3$ of 10 g, and ethanol of 1000 mL are mixed and kneaded into a slurry shape. After that, the slurry is dried in the drier of 130° C., broken, and sieved into the particles of 75 μm or less, thereby manufacturing the cathode active material. A center particle diameter of the cathode active material is equal to 12.2 μm and a specific surface area is equal to 0.21 $m^2/g$. Subsequently, with respect to the cathode active material, element distribution is surface-analyzed by the SEM-EDS. Thus, the phosphorus P elements are detected at a larger mole ratio to the amount of the materials used for manufacturing the cathode active material and it has been found that many phosphorus P elements exist in the surface of the cathode active material.

Subsequently, a secondary battery is manufactured in substantially the same manner as that of foregoing Example 1 except that the cathode active material manufactured as mentioned above is used.

Example 6

A cathode active material is manufactured as follows. $LiCoO_2$ of 5000 g in which a center particle diameter is equal to 12 μm and a specific surface area is equal to 0.20 $m^2/g$, $H_3PO_3$ of 20 g, and ethanol of 1000 mL are mixed and kneaded into a slurry shape. After that, the slurry is dried in the drier of 130° C., broken, and sieved into the particles of 75 μm or less, thereby manufacturing the cathode active material. A center particle diameter of the cathode active material is equal to 12.2 μm and a specific surface area is equal to 0.21 $m^2/g$. Subsequently, with respect to the cathode active material, element distribution is surface-analyzed by the SEM-EDS. Thus, the phosphorus P elements are detected at a larger mole ratio to the amount of the materials used for manufacturing the cathode active material and it has been found that many phosphorus P elements exist in the surface of the cathode active material.

Subsequently, a secondary battery is manufactured in substantially the same manner as that of foregoing Example 1 except that the cathode active material manufactured as mentioned above is used.

Example 7

A cathode is manufactured as follows. $LiCoO_2$ of 95.8 weight parts in which a center particle diameter is equal to 12 μm and a specific surface area is equal to 0.20 $m^2/g$, polyvinylidene fluoride of 3 weight parts as a binder, ketjen black of 1 weight part as a conductive material, and $H_3PO_3$ of 0.2 weight part are kneaded in N-methyl pyrrolidone as a dispersion medium, thereby obtaining a cathode mixture slurry. The cathode collector having a thickness of 30 μm and made of aluminum is coated with the cathode mixture slurry, the slurry is dried, and the collector is compression-molded by the roll pressing machine, thereby forming a cathode active material layer and manufacturing the cathode.

Figure 6:
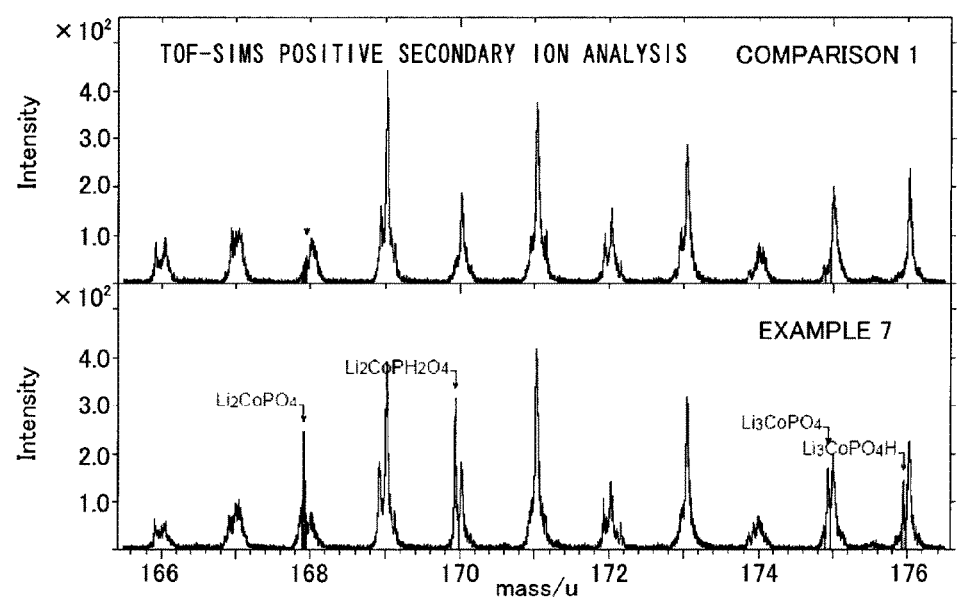
FIG. 6 is a graph showing a result according to a TOF-SIMS positive secondary ion analysis of a cathode in each of Example 7 and Comparison 1.
Figure 7:
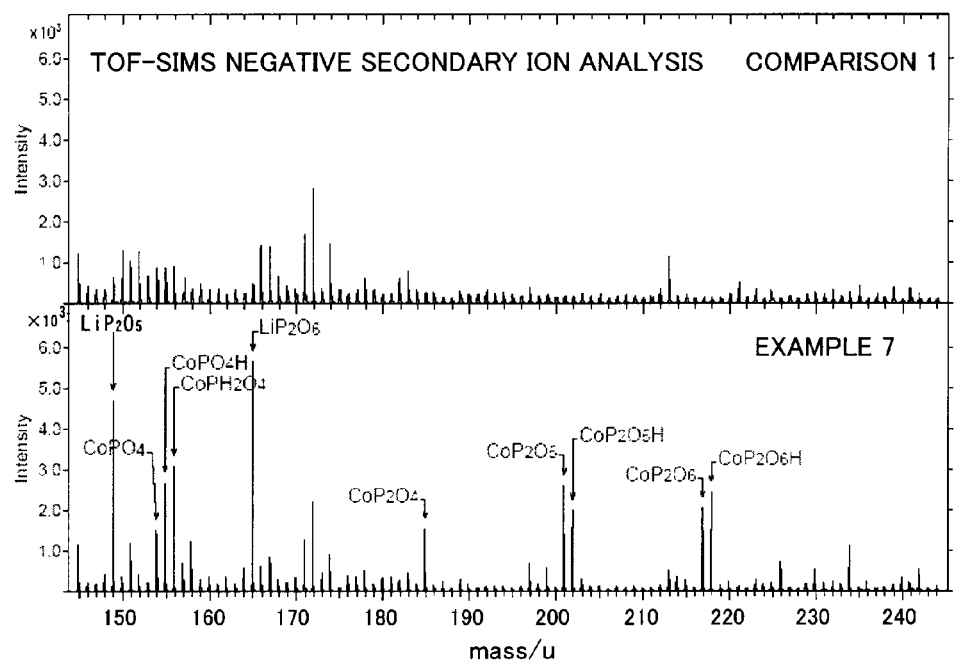
FIG. 7 is a graph showing a result according to a TOF-SIMS negative secondary ion analysis of the cathode in each of Example 7 and Comparison 1.

Subsequently, the cathode is analyzed by the TOF-SIMS. Analysis results are shown in FIGS. 6 and 7. As shown in FIGS. 6 and 7, the peaks of the fragments based on the positive secondary ions of $Li_4PO_4$, $Li_2CoPO_4$, $Li_2CoPH_2O_4$, $Li_3CoPO_4$, and $Li_3CoPO_4H$ and the negative secondary ions of $PO_2$, $LiP_2O_4$, $Co_2PO_4$, $CoP_2O_5$, $CoP_2O_5H$, $CoP_2O_6$, and $CoP_2O_6H$ are observed. Those results indicate that the compounds such as $Li_3PO_4$, $LiCoPO_4$, and the like have been produced in the particle surface of the cathode active material.

Figure 8:
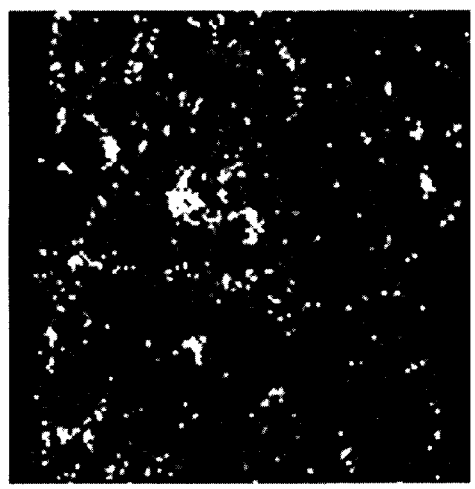
FIG. 8 is a cross sectional view showing a result of the TOF-SIMS surface analysis of the cathode in Example 7.
Figure 8:

Subsequently, the cathode is analyzed by the TOF-SIMS as follows. The cathode is embedded with the resin and cross-sectional work-processed by the argon ion milling apparatus. Thereafter, the TOF-SIMS analysis is performed. In the TOF-SIMS analysis, "TOF-SIMSV" made by ION-TOF Co., Ltd. is used. Measuring conditions are set as follows: the primary ions are set to 197Au+; the accelerating voltage of the ion gun is set to 25 keV; the unbunching; the irradiation ion current is set to 0.5 pA (measured by the pulse beam); the pulse frequency is set to 50 kHz; the mass range is set to 1 to 200 amu; the scanning range is set to 25×25 μm;

and the spatial resolution is set to 0.2 um. An analysis result is shown in FIG. 8. It will be understood from FIG. 8 that the phosphorus compound such as $PO_3$ exists so as to cover the $LiCoO_2$ particle.

Subsequently, a secondary battery is manufactured in substantially the same manner as that of foregoing Example 1 except that the cathode manufactured as mentioned above is used.

Example 8

A cathode is manufactured as follows. $LiCoO_2$ of 95.8 weight parts in which a center particle diameter is equal to 12 μm and a specific surface area is equal to 0.20 m$^2$/g, polyvinylidene fluoride of 3 weight parts as a binder, ketjen black of 1 weight part as a conductive material, and $H_3PO_3$ of 0.4 weight part are kneaded in N-methyl pyrrolidone as a dispersion medium, thereby obtaining a cathode mixture slurry. The cathode collector having a thickness of 30 μm and made of aluminum is coated with the cathode mixture slurry, the slurry is dried, and the collector is compression-molded by the roll pressing machine, thereby forming a cathode active material layer and manufacturing the cathode.

The cathode is analyzed by the TOF-SIMS, so that the same peaks of the secondary ion fragments as those in Example 7 are observed.

Subsequently, a secondary battery is manufactured in substantially the same manner as that of foregoing Example 1 except that the cathode manufactured as mentioned above is used.

(Comparison 1)

A cathode is manufactured as follows. $LiCoO_2$ of 96 weight parts in which a center particle diameter is equal to 12 μm and a specific surface area is equal to 0.20 m$^2$/g, polyvinylidene fluoride of 3 weight parts as a binder, and ketjen black of 1 weight part as a conductive material are kneaded in N-methylpyrrolidone as a dispersion medium, thereby obtaining a cathode mixture slurry. The cathode collector having a thickness of 30 μm and made of aluminum is coated with the cathode mixture slurry, the slurry is dried, and the collector is compression-molded by the roll pressing machine, thereby forming a cathode active material layer and manufacturing the cathode.

Figure 9:
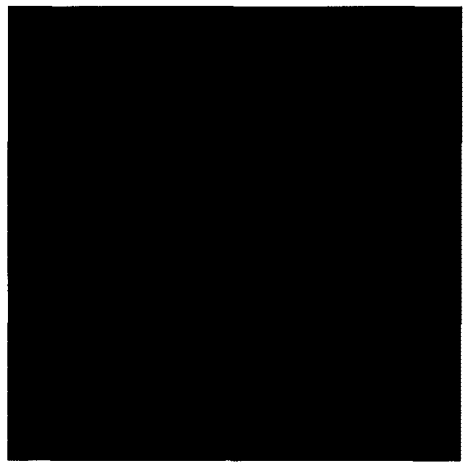
FIG. 9 is a cross sectional view showing a result of the TOF-SIMS surface analysis of the cathode in Comparison 1.
Figure 9:
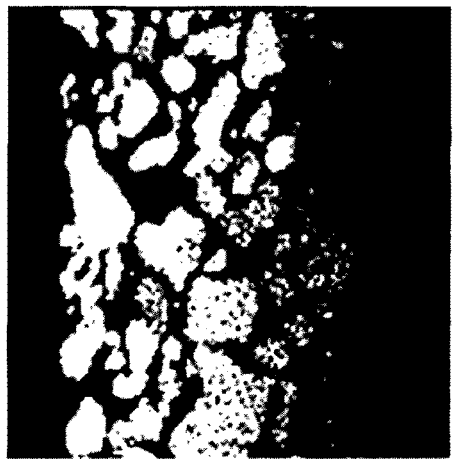

Subsequently, the cathode is analyzed by the TOF-SIMS. Analysis results are shown in FIGS. 6 and 7. As shown in FIGS. 6 and 7, the peaks of the fragments based on the positive secondary ions of $Li_4PO_4$, $Li_2CoPO_4$, $Li_2CoPH_2O_4$, $Li_3CoPO_4$, and $Li_3CoPO_4H$ and the negative secondary ions of $PO_2$, $LiP_2O_4$, $Co_2PO_4$, $CoP_2O_5$, $CoP_2O_5H$, $CoP_2O_6$, and $CoP_2O_6H$ are not observed. Subsequently, the cathode is analyzed by the TOF-SIMS in a manner similar to foregoing Example 7. An analysis result is shown in FIG. 9. It will be understood from FIG. 9 that no phosphorus compound exists in the plane.

Subsequently, a secondary battery is manufactured in substantially the same manner as that of foregoing Example 1 except that the cathode manufactured as mentioned above is used.

(Evaluation of High-temperature Preserving Characteristics)

Subsequently, with respect to the secondary batteries manufactured as mentioned above, constant current charging is executed at a constant current of 0.2 C until a battery voltage reaches 4.4V. After that, constant voltage charging is executed at a constant voltage of 4.4V until a current value reaches a value corresponding to 0.01 C. Subsequently, constant current discharging is executed at a constant current density of 0.2 C. until the battery voltage reaches 2.5V. A high-temperature preserving test is performed as follows in order to evaluate the high-temperature preserving characteristics by separating an amount of gas generation which is caused by the cathode. The secondary battery which was charged to 4.4V again after the first charging/discharging is decomposed. Only the cathode is taken out, wound, and packed to an aluminum laminate of 4 cm×5 cm. The pack is preserved in a thermostat of 85° C. for 12 hours. After that, an increase amount of a pack thickness is obtained from the pack thicknesses measured before and after the preservation. The thickness increase amount is used as a scale of the amount of gas generation caused by the cathode.

Subsequently, thickness change ratios in Examples 1 to 8 and Comparison 1 are obtained by the following equation by using the thickness increase amount obtained as mentioned above. Results are shown in Table 1. The thickness change ratios are obtained on the assumption that the pack thickness change ratio in Comparison 1 is set to 100%.

Thickness change ratio (%) of aluminum laminate pack=[(pack thickness increase amount (mm) after the preservation at 85° C. for 12 hours of each Example)/(pack thickness increase amount (mm) after the preservation at 85° C. for 12 hours in Comparison 1)]×100

TABLE 1

|  | ADDITION ELEMENT MOLE RATIO (at %) | FIRST EFFICIENCY (%) | THICKNESS CHANGE RATIO (%) |
| --- | --- | --- | --- |
| EXAMPLE 1 | S/Co:0.5 | 94.5 | 69 |
| EXAMPLE 2 | S/Co:1.0 | 94.5 | 70 |
| EXAMPLE 3 | P/Co:0.3 | 94.7 | 63 |
| EXAMPLE 4 | P/Co:0.7 | 94.3 | 54 |
| EXAMPLE 5 | P/Co:0.2 | 94.3 | 13 |
| EXAMPLE 6 | P/Co:0.4 | 94.5 | 14 |
| EXAMPLE 7 | P/Co:0.2 | 94.2 | 16 |
| EXAMPLE 8 | P/Co:0.4 | 94.3 | 15 |
| COMPARISON 1 | — | 94.5 | 100 |

It will be understood from Table 1 that in Examples 1 to 8, the increase in thickness of the laminate pack that is caused by the high-temperature preservation can be suppressed as compared with Comparison 1. Therefore, it will be understood that in Examples 1 to 8, the gas generation that is caused by the reaction of the cathode and the electrolytic solution in the full charging state can be suppressed.

In each of Example 9 and Comparison 2, a secondary battery is manufactured by using the cathode formed by using the cathode active material particle containing phosphorus P in the surface, the anode containing graphite, and the electrolytic solution obtained by mixing ethylene carbonate EC and diethyl carbonate DEC at a mass ratio of 3:7. The preserving characteristics are evaluated while changing an upper limit voltage of this secondary battery.

Example 9

In an embodiment, the cathode is manufactured as follows. $LiCoO_2$ of 5000 g in which a center particle diameter is equal to 12 μm and a specific surface area is equal to 0.20 m$^2$/g, $H_3PO_3$ of 10 g, and ethanol of 1000 mL are mixed and kneaded into a slurry shape. After that, the slurry is dried in the drier of 130° C., broken, and sieved into the particles of 75 μm or less, thereby manufacturing the cathode active material. A center particle diameter of the cathode active material is equal to 12.2 μm and a specific surface area is equal to 0.21 m²/g. Subsequently, with respect to the cathode active material, element distribution is surface-analyzed by the SEM-EDS. Thus, the phosphorus P elements are detected at a larger mole ratio to the amount of the materials used for manufacturing the cathode active material and it has been found that many phosphorus P elements exist in the surface of the cathode active material. With respect to the cathode active material, an analysis is made by the TOF-SIMS. Thus, many elements of $Li_3PO_4$, $LiCoPO_4$, and the like exist in the portion near the surface of the cathode active material particle as compared with those in other portions.

Subsequently, the cathode active material of 96 weight parts manufactured as mentioned above, polyvinylidene fluoride of 3 weight parts as a binder, and ketjen black of 1 weight part as a conductive material are kneaded in N-methylpyrrolidone as a dispersion medium, thereby obtaining a cathode mixture slurry. The cathode collector having a thickness of 30 μm and made of aluminum is coated with the cathode mixture slurry, the slurry is dried, and the collector is compression-molded by the roll pressing machine, thereby forming a cathode active material layer and manufacturing the cathode.

The graphite serving as an anode active material and polyvinylidene fluoride PVDF as a binder are mixed at a mass ratio of 90:10, thereby forming an anode mixture. The anode mixture is dispersed into 1-methyl-2-pyrrolidone, thereby forming an anode mixture slurry. Subsequently, the anode collector is coated with the anode mixture slurry, the solvent is dried, and thereafter, the collector is compression-molded by the roll pressing machine, thereby forming an anode active material layer and manufacturing an anode.

The cathode and the anode manufactured as mentioned above are laminated through the separator as a film made of polypropylene and wound in the longitudinal direction. After that, the protecting tape is adhered to the outermost peripheral portion, thereby manufacturing the battery element.

Finally, the manufactured battery element is sandwiched between the sheathing members each made of the aluminum laminate film obtained by sandwiching the aluminum foil by polyolefin. Outer peripheral edge portions excluding one side are thermally melt-bonded into a sack shape. The battery element is enclosed in the sheathing member. Subsequently, the electrolytic solution is injected into the sheathing member from the non-bonded portion and the non-bonded portion of the sheathing member is thermally melt-bonded and sealed. As an electrolytic solution, $LiPF_6$ as a lithium salt is dissolved at a ratio of 1.0 mol/dm³ into a solvent obtained by mixing ethylene carbonate EC and diethyl carbonate DEC at a mass ratio of 3:7 and an obtained solution is used. In this manner, the flat secondary battery of the 500 mAh class is manufactured.

(Comparison 2)

The cathode is manufactured as follows. $LiCoO_2$ of 96 weight parts in which a center particle diameter is equal to 12 μm and a specific surface area is equal to 0.20 m²/g, polyvinylidene fluoride of 3 weight parts as a binder, and ketjen black of 1 weight part as a conductive material are kneaded in N-methylpyrrolidone as a dispersion medium, thereby obtaining a cathode mixture slurry. The cathode collector having a thickness of 30 μm and made of aluminum is coated with the cathode mixture slurry, the slurry is dried, and the collector is compression-molded by the roll pressing machine, thereby forming a cathode active material layer and manufacturing the cathode.

The secondary battery is manufactured in substantially the same manner as that of foregoing Example 9 except that the cathode manufactured as mentioned above is used.

(Evaluation of High-temperature Preserving Characteristics)

With respect to the secondary batteries manufactured as mentioned above, the charging is executed while changing the upper limit voltage as will be explained hereinbelow, and the high-temperature preserving characteristics are evaluated. First, with respect to the batteries manufactured as mentioned above, the constant current charging is executed at the constant current of 0.2 C until the battery voltage reaches the upper limit voltages of 4.2V, 4.3V, and 4.4V. After that, the constant voltage charging is executed at the constant voltage of each of the above voltages until the current value reaches a value corresponding to 0.05 C. Subsequently, the constant current discharging is executed at the constant current density of 0.2 C until the battery voltage reaches 2.7V. The battery which was charged again to the upper limit voltages of 4.2V, 4.3V, and 4.4V after the first charging/discharging is preserved in the thermostat of 85° C. for 12 hours. After that, a thickness increase amount is obtained from the battery thicknesses measured before and after the preservation. An impedance increase amount is obtained from AC impedance values (resistance values at 0.1 Hz) measured before and after the preservation.

Subsequently, by substituting the thickness increase amount and impedance increase amount obtained as mentioned above into the following equations, a thickness change ratio and an impedance change ratio are obtained. Results are shown in Table 2. The thickness change ratio is obtained on the assumption that the thickness change ratio in Comparison 2 is set to 100%. The impedance change ratio is obtained on the assumption that the impedance change ratio in Comparison 2 is set to 100%.

Battery thickness change ratio (%)=[(battery thickness increase amount (mm) after the high-temperature preservation in Example 9)/(battery thickness increase amount (mm) after the high-temperature preservation in Comparison 2)]×100

Impedance change ratio (%)=[(impedance increase amount (Ω) after the high-temperature preservation in Example 9)/(impedance increase amount (Ω) after the high-temperature preservation in Comparison 2)]×100

TABLE 2

|  | CATHODE | ANODE | ELECTROLYTIC SOLUTION COMPOSITIONS | CHARGE UPPER LIMIT VOLTAGE (%) | THICKNESS CHANGE RATIO (%) | IMPEDANCE CHANGE RATIO (%) |
|---|---|---|---|---|---|---|
| EXAMPLE 9 | CATHODE 1 | GRAPHITE | EC:DEC | 4.2 | 75 | 80 |
| EXAMPLE 9 | CATHODE 1 | GRAPHITE | EC:DEC | 4.3 | 53 | 41 |
| EXAMPLE 9 | CATHODE 1 | GRAPHITE | EC:DEC | 4.4 | 42 | 36 |
| COMPARISON 2 | CATHODE 2 | GRAPHITE | EC:DEC | 4.2 | 100 | 100 |

TABLE 2-continued

| | CATHODE | ANODE | ELECTROLYTIC SOLUTION COMPOSITIONS | CHARGE UPPER LIMIT VOLTAGE (%) | THICKNESS CHANGE RATIO (%) | IMPEDANCE CHANGE RATIO (%) |
|---|---|---|---|---|---|---|
| COMPARISON 2 | CATHODE 2 | GRAPHITE | EC:DEC | 4.3 | 100 | 100 |
| COMPARISON 2 | CATHODE 2 | GRAPHITE | EC:DEC | 4.4 | 100 | 100 |

CATHODE 1: CATHODE FORMED BY USING CATHODE ACTIVE MATERIAL PARTICLE CONTAINING PHOSPHORUS IN THE SURFACE
CATHODE 2: CATHODE FORMED BY USING CATHODE ACTIVE MATERIAL PARTICLE CONTAINING NO PHOSPHORUS IN THE SURFACE

It will be understood from Table 2 that in Example 9, the thickness increase amount and the impedance increase amount of the secondary battery after the high-temperature preservation have been suppressed as compared with those in Comparison 2. It will be also understood that in Example 9, an expansion amount suppressing effect of the cathode increases with an increase in upper limit voltage upon charging and a larger effect is obtained in the secondary battery whose energy density has been improved by raising the upper limit voltage.

In Examples 10 to 13 and Comparisons 3 to 5, the high-temperature preserving characteristics are evaluated while changing the constructions of the cathode, anode, and electrolytic solution.

Example 10

A secondary battery is manufactured in substantially the same manner as that of foregoing Example 9.

Example 11

The anode is manufactured as follows by a coating method by using silicon as an anode active material. Metal silicon (purity: 99%) broken in a chip shape is pulverized into powder by a jet mill until its mean diameter reaches 1 µm. This silicon powder is dispersed into polyamide acid (polyimide precursor) of 3 weight %/NMP solution, thereby obtaining a slurry. An electrolytic copper foil as an anode collector is coated with the slurry. The slurry is dried and the collector is compression-molded by the roll pressing machine. After that, a heat process is executed in a vacuum at 400° C. for 3 hours, thereby manufacturing the anode. In this state, initial slurry compositions are adjusted so that a weight ratio of silicon and polyimide is equal to 90:10 based on the weight measurement.

A secondary battery is manufactured in substantially the same manner as that of foregoing Example 9 except that the anode manufactured as mentioned above is used.

Example 12

The electrolytic solution is manufactured as follows. As an electrolyte, $LiPF_6$ as a lithium salt is dissolved at a ratio of 1.0 mol/dm$^3$ into a solvent obtained by mixing difluoro ethylene carbonate DFEC, ethylene carbonate EC, and diethyl carbonate DEC at a mass ratio of 5:25:70, thereby forming the electrolytic solution.

A secondary battery is manufactured in substantially the same manner as that of foregoing Example 11 except that the electrolytic solution manufactured as mentioned above is used.

Example 13

The anode is manufactured as follows by an evaporation depositing method by using silicon as an anode active material. While metal silicon (purity: 99%) similar to that used in Example 11 is used as a raw material and an oxygen gas diluted by argon is introduced into a chamber, a partially-oxidized amorphous silicon layer having a thickness of 4 µm is formed onto the electrolytic copper foil having the coarse surface by an electron beam evaporation depositing method, thereby manufacturing an anode.

A secondary battery is manufactured in substantially the same manner as that of foregoing Example 12 except that the anode manufactured as mentioned above is used.

(Comparison 3)

A secondary battery is manufactured in substantially the same manner as that of foregoing Comparison 2.

(Comparison 4)

The anode is manufactured in a manner similar to Example 11. A secondary battery is manufactured in substantially the same manner as that of foregoing Comparison 3 except that the anode manufactured as mentioned above is used.

(Comparison 5)

An electrolytic solution is manufactured in a manner similar to Example 12. A secondary battery is manufactured in substantially the same manner as that of foregoing Comparison 4 except that the electrolytic solution manufactured as mentioned above is used.

(Evaluation of High-temperature Preserving Characteristics)

With respect to the batteries manufactured as mentioned above, the constant current charging is executed at the constant current of 0.2 C until the battery voltage reaches the upper limit voltage of 4.2V. After that, the constant voltage charging is executed at the constant voltage of this voltage until the current value reaches a value corresponding to 0.05 C. Subsequently, the constant current discharging is executed at the constant current density of 0.2 C until the battery voltage reaches 2.7V. The battery which was charged again to the upper limit voltage after the first charging/discharging is preserved in the thermostat of 85° C. for 12 hours. After that, a thickness increase amount is obtained from the battery thicknesses measured before and after the preservation. Subsequently, by substituting the thickness increase amount obtained as mentioned above into the following equation, a thickness change ratio is obtained. A result is shown in Table 3. The thickness change ratio is obtained on the assumption that the battery thickness change ratio in Comparison 2 is set to 100%.

> Battery thickness change ratio (%)=[(battery thickness increase amount (mm) after the high-temperature preservation in each of Examples 10 to 13 and Comparisons 4 and 5)/(battery thickness increase amount (mm) after the high-temperature preservation in Comparison 3)]×100

(Evaluation of Cycle Characteristics)

With respect to the secondary batteries manufactured as mentioned above, the charging/discharging similar to those in the foregoing evaluation of the high-temperature preserving characteristics are repeated by 100 cycles, thereby obtaining a discharge capacitance at the first cycle and a discharge capacitance at the 100th cycle. By substituting the discharge capacitance values into the following equation, a capacitance maintaining ratio after 100 cycles is obtained. A result is shown in Table 3.

Capacitance maintaining ratio after 100 cycles (%)=
[(discharge capacitance (mAh) at the 100th cycle)/(discharge capacitance (mAh) at the 1st cycle)]×100

TABLE 3

| | CATHODE | ANODE | ELECTROLYTIC SOLUTION COMPOSITIONS | THICKNESS CHANGE RATIO (%) | CAPACITANCE MAINTAINING RATIO (%) |
|---|---|---|---|---|---|
| EXAMPLE 10 | CATHODE 1 | GRAPHITE | EC:DEC | 75 | 95 |
| EXAMPLE 11 | CATHODE 1 | Si COATING | EC:DEC | 40 | 41 |
| EXAMPLE 12 | CATHODE 1 | Si COATING | DFEC:EC:DEC | 111 | 91 |
| EXAMPLE 13 | CATHODE 1 | Si EVAPORATION-DEPOSITED | DFEC:EC:DEC | 119 | 91 |
| COMPARISON 3 | CATHODE 2 | GRAPHITE | EC:DEC | 100 | 94 |
| COMPARISON 4 | CATHODE 2 | Si COATING | EC:DEC | 208 | 40 |
| COMPARISON 5 | CATHODE 2 | Si COATING | DFEC:EC:DEC | 803 | 90 |

CATHODE 1: CATHODE FORMED BY USING CATHODE ACTIVE MATERIAL PARTICLE CONTAINING PHOSPHORUS IN THE SURFACE
CATHODE 2: CATHODE FORMED BY USING CATHODE ACTIVE MATERIAL PARTICLE CONTAINING NO PHOSPHORUS IN THE SURFACE

The following points can be understood from Table 3. When comparing the evaluation results of Comparisons 3 and 4, in the case where the anode in which silicon Si is used as an anode active material is used in place of the anode in which graphite is used as an anode active material, it will be understood that the thickness change ratio of the high-temperature preservation is increased by about two times and the cycle characteristics deteriorate fairly. When comparing the evaluation results of Comparisons 4 and 5, in the secondary battery using the anode containing silicon Si as an anode active material, it will be understood that although the cycle characteristics are remarkably improved in the case of using the electrolytic solution containing the fluorine system solvent, the high-temperature preserving characteristics deteriorates fairly.

When comparing the evaluation results of Examples 12 and 13, in the secondary battery using the cathode formed by using the cathode active material particle containing phosphorus P in the surface, in the case where the anode containing silicon Si as an anode active material is used and the electrolytic solution containing a fluorine system solvent is used, it will be understood that the high-temperature preserving characteristics and the cycle characteristics which are almost equal to those in the secondary battery using the anode containing graphite as an anode active material can be also obtained.

When comparing the evaluation results of Example 10 and Comparison 3, in the secondary battery using the anode containing graphite as an anode active material, it will be understood that by using the cathode formed by using the cathode active material particle containing phosphorus P in the surface, the thickness change ratio of the high-temperature preservation can be suppressed into about 3/4. On the other hand, when comparing the evaluation results of Example 12 and Comparison 5, in the secondary battery using anode containing silicon as an anode active material, it will be understood that by using the cathode formed by using the cathode active material particle containing phosphorus P in the surface, the thickness change ratio of the high-temperature preservation can be suppressed into about 1/8. That is, it will be understood that the cathode formed by using the cathode active material particle containing phosphorus P in the surface provides the effect even in the secondary battery using the anode containing graphite as an anode active material, the further large effect is obtained in the secondary battery using silicon Si as an anode active material.

Although the embodiments and Examples of the invention have specifically been described above, the invention is not limited to the foregoing embodiments and Examples but various modifications based on the technical idea of the invention are possible.

For example, the numerical values mentioned in the foregoing embodiments and Examples are nothing but examples and other numerical values different from them can be also used as necessary.

Although the embodiments and Examples have been described above with respect to the cases where the invention is applied to the flat type secondary battery and the cylindrical secondary battery, the invention can be also applied to other secondary batteries of a rectangular type, a button type, a thin type, a large type, and a laminated type. The invention is not limited to the secondary battery but can be also applied to a primary battery.

Although the foregoing embodiments and Examples have been described with respect to a secondary battery using the simple substance of graphite or silicon Si as an anode active material, the cathode active material or the cathode can be also similarly applied to the secondary battery in which an alloy containing silicon Si, a mixture of silicon Si and carbon C, or a simple substance or a compound containing an element such as tin Sn, germanium Ge, or the like is used as an anode active material.

In the above embodiments, for example, the lithium composite oxide having the stratified structure shown in Formula 2, the lithium composite phosphate having the structure of the phosphate system shown in Formula 3, or the like can be also used as a lithium composite oxide.

  (Formula 2)

in Formula 2, M1 denotes at least one kind of elements selected from Groups 2 to 15 excluding Ni and Mn; X denotes at least one kind selected from elements in Groups 16 and 17 excluding oxygen O; p indicates a value within a range of 0≤p≤1.5; q indicates a value within a range of 0≤q≤1.0; r indicates a value within a range of 0≤r≤1.0; y indicates a value within a range of −0.10≤y≤0.20; and z indicates a value within a range of 0≤z≤0.2, and

  (Formula 3)

in Formula 3, M2 denotes at least one kind of elements selected from Groups 2 to 15; a indicates a value within a range of 0≤a≤2.0; and b indicates a value within a range of 0.5≤b≤2.0.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A secondary battery comprising a cathode, an anode, and an electrolyte, wherein
   the cathode comprises particles of a cathode active material, each particle comprising
     a core comprising (i) a lithium composite oxide comprising lithium (Li) and cobalt (Co) and (ii) a first content of an element selected from the group consisting of sulfur (S), phosphorus (P), and a combination thereof, and
     a surface layer on a surface of the core, the surface layer comprising the element in a second content more than the first content of the element in the core, an atomic % ratio of the second content of the element to a content of cobalt (Co) in the cathode active material ranging from 0.1 to 5, the surface layer comprising the element in a compound selected from the group consisting of $Li_2SO_4$, $LiCoPO_4$, and combinations thereof;
   the anode comprises an anode active material including Si; and
   the electrolyte comprises a compound of fluorinated cyclic or chain-like carbonate in which a part or all of hydrogen is fluorinated, and includes ethylene carbonate EC, diethyl carbonate DEC and DFEC,
   the anode comprises an anode collector covered with the metal or semimetal material.

2. The secondary battery according to claim 1, wherein the lithium composite oxide has an average composition expressed by Formula 1, $$Li_xCo_{1-y}M_yO_{b-a}X_a$$ (Formula 1)

wherein M denotes an element selected from the group consisting of boron (B), magnesium (Mg), aluminum (Al), silicon (Si), phosphorus (P), sulfur (S), titanium (Ti), chromium (Cr), manganese (Mn), iron (Fe), cobalt (Co), nickel (Ni), copper (Cu), zinc (Zn), gallium (Ga), yttrium (Y), zirconium (Zr), molybdenum (Mo), silver (Ag), tungsten (W), indium (In), tin (Sn), lead (Pb), and antimony (Sb); X denotes a halogen element; and x, y, a, and b respectively indicate a value within a range of 0.2<x≤1.2, a value within a range of 0≤y≤0.1, a value within a range of 1.8≤b≤2.2, and a value within a range of 0≤a≤1.0.

3. The secondary battery according to claim 1, wherein a center particle diameter of the cathode active material ranges from 1 μm or more to less than 30 μm.

4. The secondary battery according to claim 1, wherein a specific surface area of the cathode active material ranges from 0.1 m²/g or more to less than 1 m²/g.

5. The secondary battery according to claim 1, wherein the metal material comprises germanium (Ge).

6. The secondary battery according to claim 1, wherein the fluorinated compound comprises difluoro ethylene carbonate.

7. The secondary battery according to claim 1, wherein an open circuit voltage per pair of the cathode and the anode in a full charging state ranges from 4.25V or more to 4.6V.

8. The secondary battery according to claim 1, wherein an open circuit voltage per pair of the cathode and the anode in a full charging state ranges from 4.35V or more to 4.6V.

9. The secondary battery according to claim 1, wherein the particle of the lithium composite oxide, containing the phosphorus (P) in the particle surface, is obtained by preparing a solution by mixing a lithium composite oxide particle, $H_3PO_3$, and a solvent, and drying the solution.

10. A secondary battery comprising a cathode, an anode, and an electrolyte, wherein
    the cathode comprises particles of a cathode active material, each particle comprising
      a core comprising a lithium composite oxide comprising lithium (Li) and cobalt (Co) and
      a surface layer on a surface of the core, the surface layer comprising an element selected from the group consisting of sulfur (S), phosphorus (P), and a combination thereof in a content that is the largest in the cathode active material, an atomic % ratio of the content of the element to a content of cobalt (Co) in the cathode active material ranging from 0.1 or more to less than 5, the surface layer comprising the element in a compound selected from the group consisting of $Li_2SO_4$, $LiCoPO_4$, and combinations thereof;
    the anode comprises an anode active material including Si; and
    the electrolyte comprises a compound of fluorinated cyclic or chain-like carbonate in which a part or all of hydrogen is fluorinated, and includes ethylene carbonate EC, diethyl carbonate DEC and DFEC,
    the anode comprises an anode collector covered with the metal material.

11. The secondary battery according to claim 10, wherein in a surface analysis by a Time-of-Flight Secondary Ion Mass Spectroscopy (ToF-SIMS), the cathode has peaks of fragments of secondary ions selected from the group consisting of $Li_4PO_4$, $Li_2CoPO_4$, $Li_2CoPH_2O_4$, $Li_3CoPO_4$, and $Li_3CoPO_4H$ and negative secondary ions of $PO_2$, $LiP_2O_4$, $Co_2PO_4$, $CoP_2O_5$, $CoP_2O_5H$, $CoP_2O_6$, $CoP_2O_6H$, and combinations thereof.

12. The secondary battery according to claim 1, wherein the lithium composite oxide comprises $LiCoO_2$.

13. The secondary battery according to claim 1, wherein the metal material comprises silicon.

14. The secondary battery according to claim 1, wherein the compound comprises $Li_2SO_4$.

15. The secondary battery according to claim 1, wherein the compound comprises $LiCoPO_4$.

16. The secondary battery according to claim 1, wherein the metal material further comprises Ti, and the anode collector of the anode is covered with Si or Ti.

17. The secondary battery according to claim 1, wherein the anode comprises anode active material layers provided on both surfaces of the anode collector, the anode active material layers comprising an anode material comprising the metal or semimetal material.

* * * * *